_US005997051A_

United States Patent [19]

Kissner et al.

[11] Patent Number: 5,997,051
[45] Date of Patent: Dec. 7, 1999

[54] SHOELACE TYING SYSTEM

[76] Inventors: Paul J Kissner; Marjorie J Kissner, both of 16430 Hamline Ave., Van Nuys, Calif. 91406-5717

[21] Appl. No.: 09/063,215
[22] Filed: Apr. 20, 1998
[51] Int. Cl.[6] .................................................. B65H 69/04
[52] U.S. Cl. ............................ 289/1.5; 289/1.2; 434/260
[58] Field of Search ............................... 289/1.2, 1.5, 17, 289/18.1; 434/260; 36/50.1; 24/712, 713.6

[56] References Cited

U.S. PATENT DOCUMENTS

| | | | |
|---|---|---|---|
| 4,342,557 | 8/1982 | Bandar | 434/260 |
| 4,764,119 | 8/1988 | Miraglia | 434/260 |
| 4,842,522 | 6/1989 | Alexander et al. | 434/260 |
| 5,778,499 | 7/1998 | Lehrman | 24/712 |

*Primary Examiner*—Michael A. Neas
*Attorney, Agent, or Firm*—Goldstein & Canino

[57] ABSTRACT

A shoelace tying system, for use with shoelaces in sneakers or shoes having lace holes, including a pair of top lace holes. A first lace end and a second lace end extend from the top lace holes. The first lace end and second lace end are tied into a simple knot or a double simple knot. The first lace end and second lace end are then tied into a bow knot, forming a first loop and a second loop from the first lace end and second lace end, respectively. The first loop and second lace end are wrapped around the bow knot and pulled between the bow knot and simple knot. The first loop and second loop are grasped, and pulled tightly opposite each other to form a double bow knot. To untie the double bow knot, the first lace end and second lace end are grasped and pulled opposite each other.

4 Claims, 8 Drawing Sheets

SHOELACE TYING SYSTEM

BACKGROUND OF THE INVENTION

The invention relates to a shoelace tying system. More particularly, the invention relates to a system for tying a shoelace on a sneaker, shoe, boot, or the like, which resists inadvertently becoming untied.

The majority of all shoes, sneakers, and boots have shoelaces for tightening the shoe onto the foot once the foot has been fully inserted into the shoe. Typically, the laces are alternately threaded through two rows of grommets, and are crisscrossed several times along the way. Once the ends of the grommet row is reached, the remaining shoelace ends are typically tied into a bow.

However, bows easily become untied. When one plays sports, because of the increased foot action, the bows have a greater tendency to become untied. This can be quite dangerous, because the player often doesn't have the opportunity to stop to tie shoelaces. As a result, the player can easily trip when another player, or even their own foot steps upon the loose end of the shoelaces.

In the 80's shoelaces were replaced with VELCRO (hook and loop fastener) in a large number of sneakers. However, VELCRO sneakers went out of style, leaving us all to contend with shoelaces, and all the problems associated therewith.

Other proposed solutions include clamps which bite into the shoelaces, and shoelaces which have frictional properties that resist slipping.

While these units may be suitable for the particular purpose employed, or for general use, they would not be as suitable for the purposes of the present invention as disclosed hereafter.

SUMMARY OF THE INVENTION

It is an object of the invention to produce a shoelace tying system which allows a pair of shoelaces to be securely tied, while the knot thus formed resists inadvertent untying.

It is another object of the invention that the shoelace tying system may be performed using any existing pair of shoelaces. The invention relates to a new manner in which to tie common shoelaces.

It is a further object of the invention that the shoelace tying system effectively prevents inadvertent untying, even while the wearer performs rigorous sport activities.

It is a still further object of the invention that the knot formed by the system of the present invention may be easily untied, when desired by the wearer.

The invention is a shoelace tying system, for use with shoelaces in sneakers or shoes having lace holes, including a pair of top lace holes. A first lace end and a second lace end extend from the top lace holes. The first lace end and second lace end are tied into a simple knot or a double simple knot. The first lace end and second lace end are then tied into a bow knot, forming a first loop and a second loop from the first lace end and second lace end, respectively. The first loop and second lace end are wrapped around the bow knot and pulled between the bow knot and simple knot. The first loop and second loop are grasped, and pulled tightly opposite each other to form a double bow knot. To untie the double bow knot, the first lace end and second lace end are grasped and pulled opposite each other.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
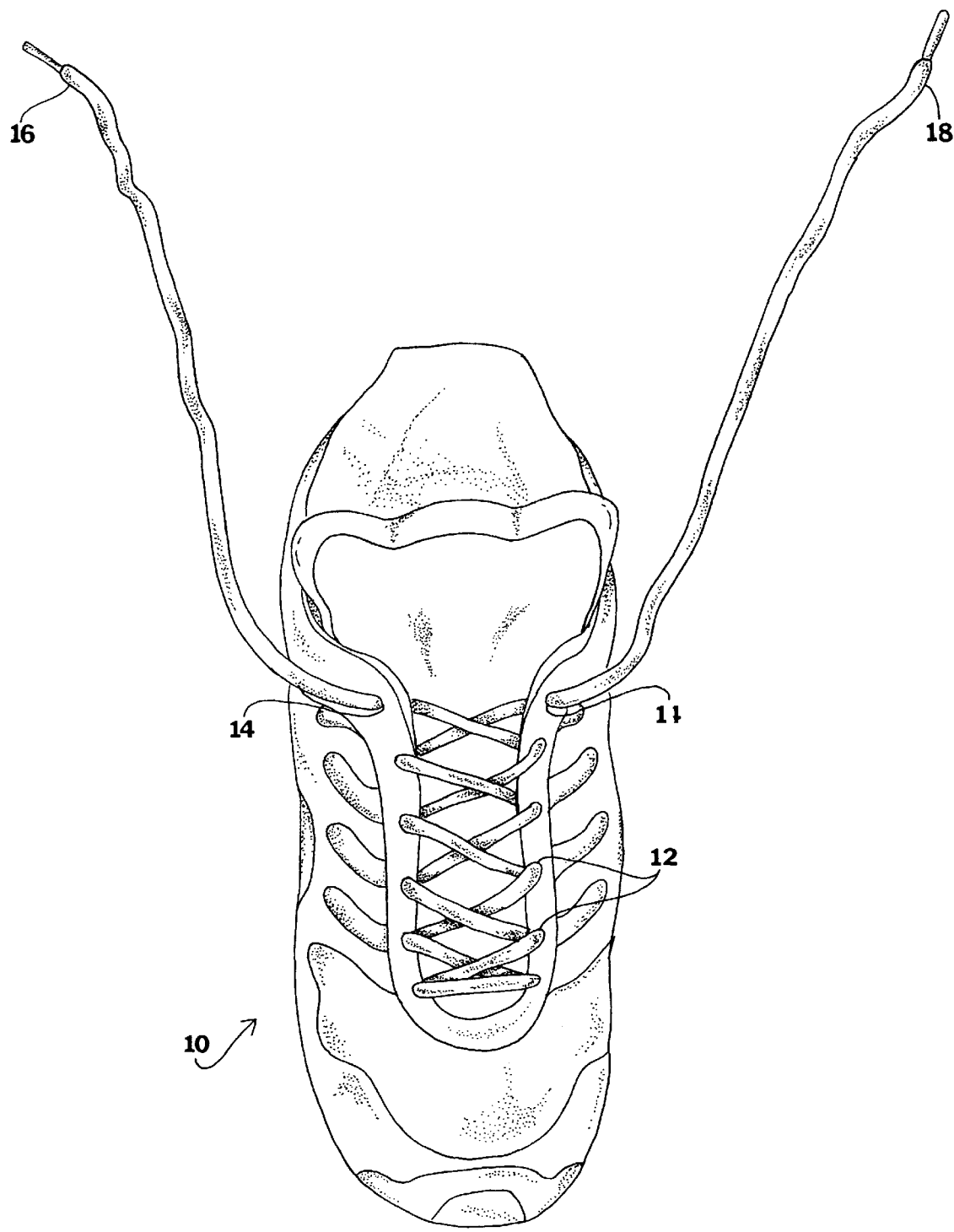
FIG. 1 is a diagrammatic perspective view, illustrating a shoelace "laced-up" in a sneaker, wherein the laces have two ends which are ready for tying.

FIG. 1 illustrates a sneaker 10, having a plurality of lace holes 12, including a pair of top lace holes 14. The sneaker 10 has been laced up in a standard fashion, wherein a pair of lace ends 16 and 18 extend from the top lace holes 14. As used herein, the term sneaker 10, can refer to a proper sneaker, or to any shoe or boot that employs shoelaces in any standard fashion.

Figure 2:
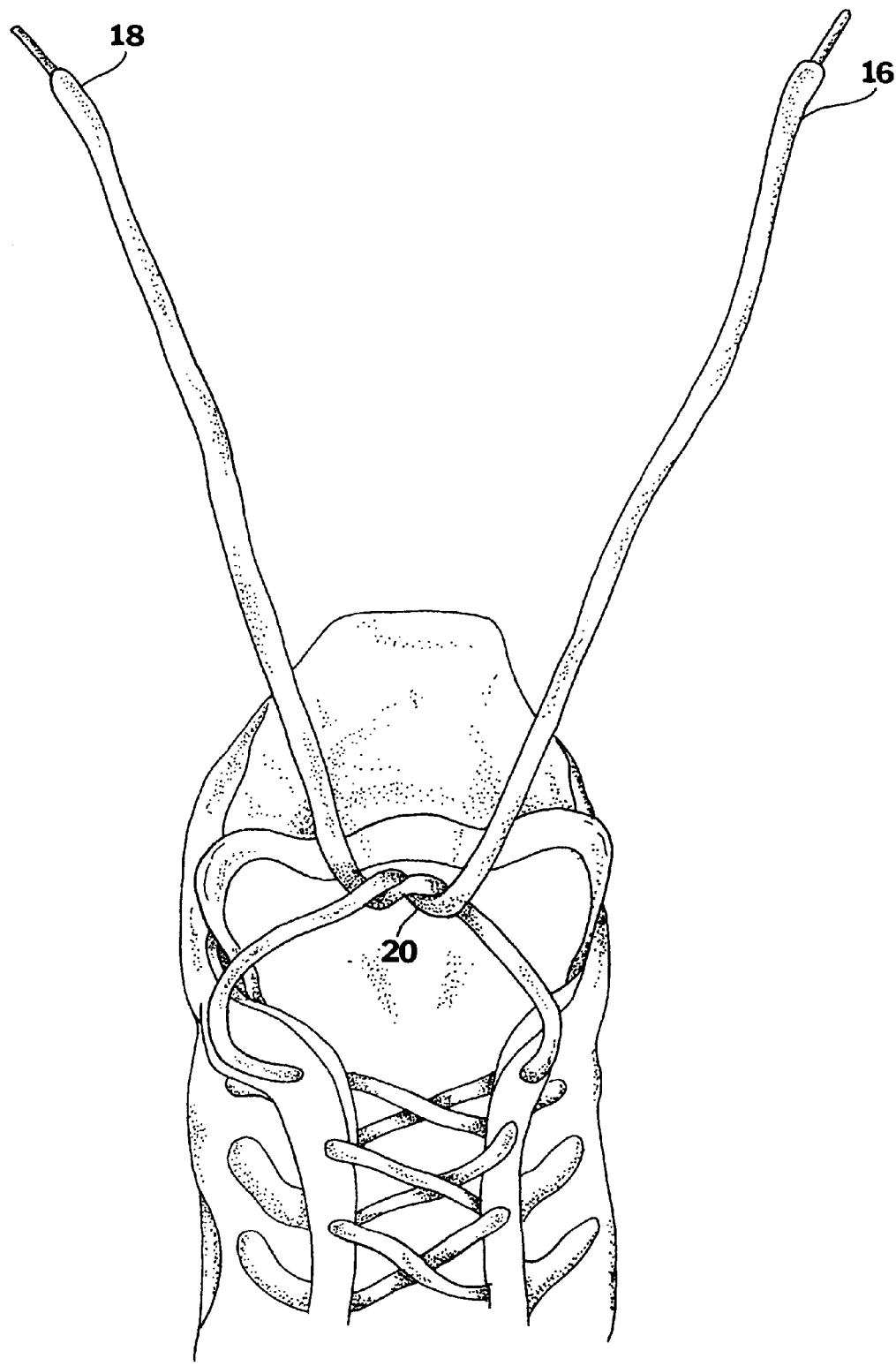
FIG. 2 is a diagrammatic perspective view, wherein the lace ends have been tied into a single knot.
Figure 3:
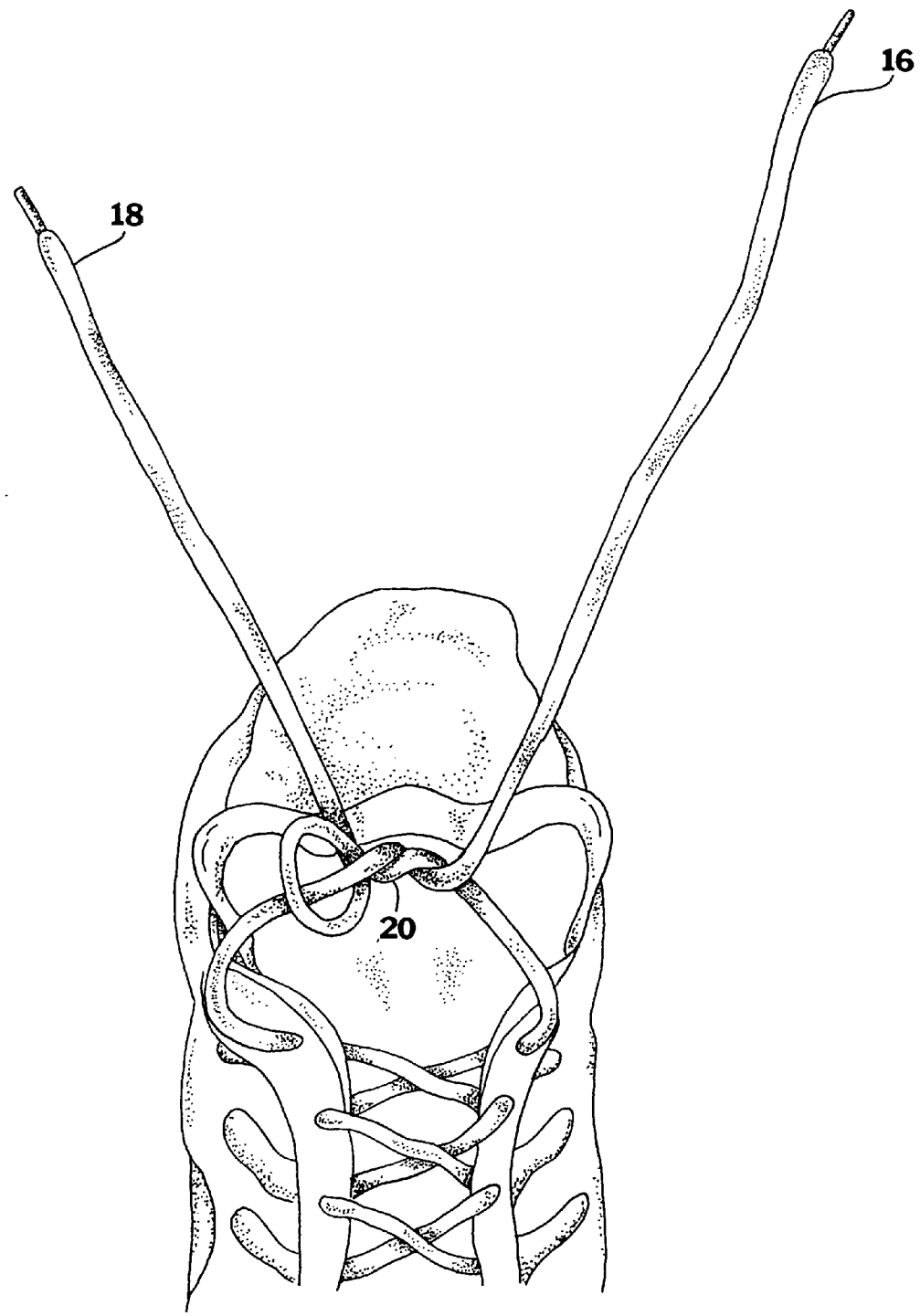
FIG. 3 is a diagrammatic perspective view, wherein one of the lace ends is looped around the single knot.

In FIG. 2, the first lace end 16 and second lace end 18 have been tied into a simple knot 20. In FIG. 3, the second lace end 18 has been looped around the first lace end 16 adjacent to the simple knot 20. Then, referring to FIG. 4, the second lace end 18 and first lace end 16 have been pulled to form a double simple knot 22.

Figure 4:
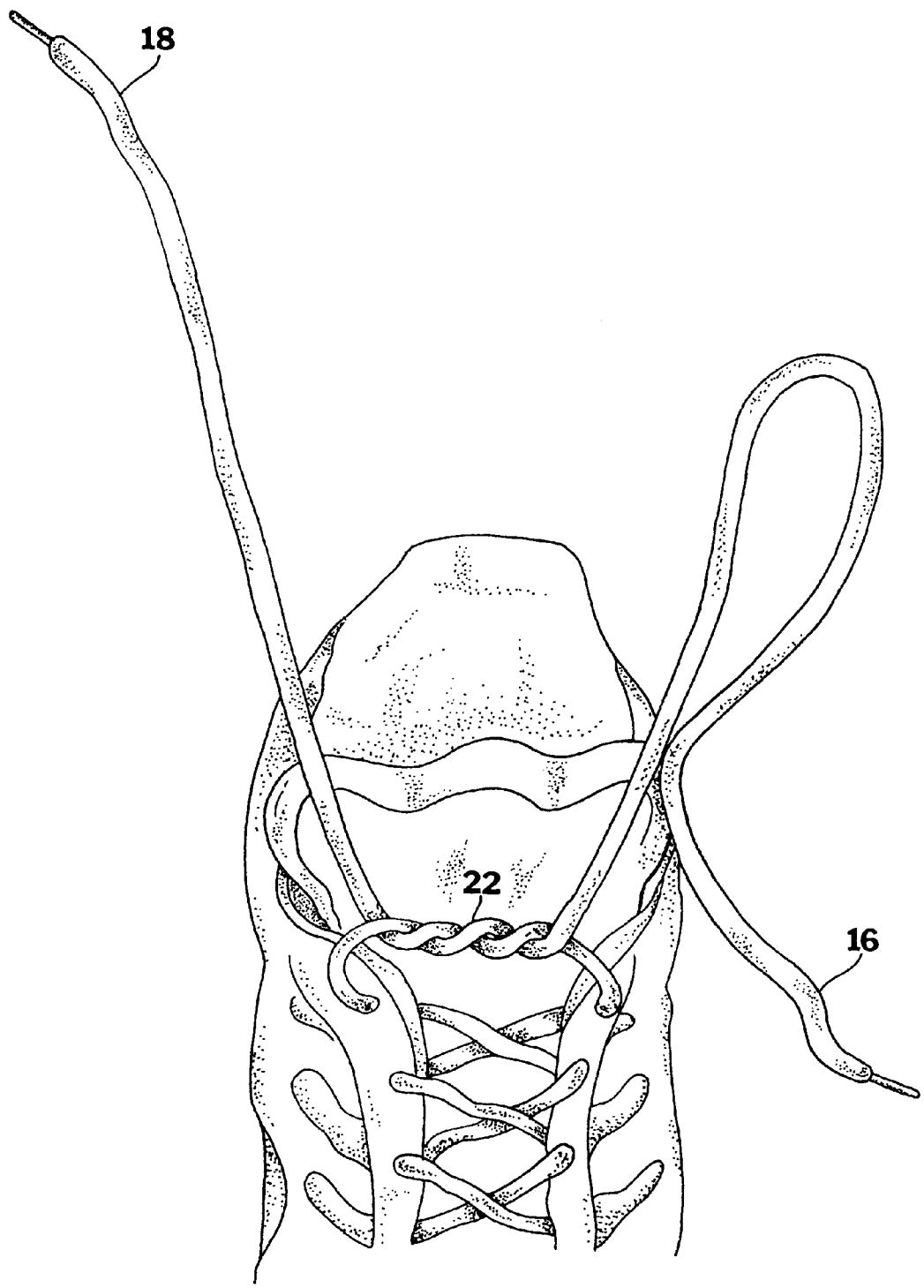
FIG. 4 is a diagrammatic perspective view, wherein the lace ends have been pulled tight into a double simple knot.
Figure 5:
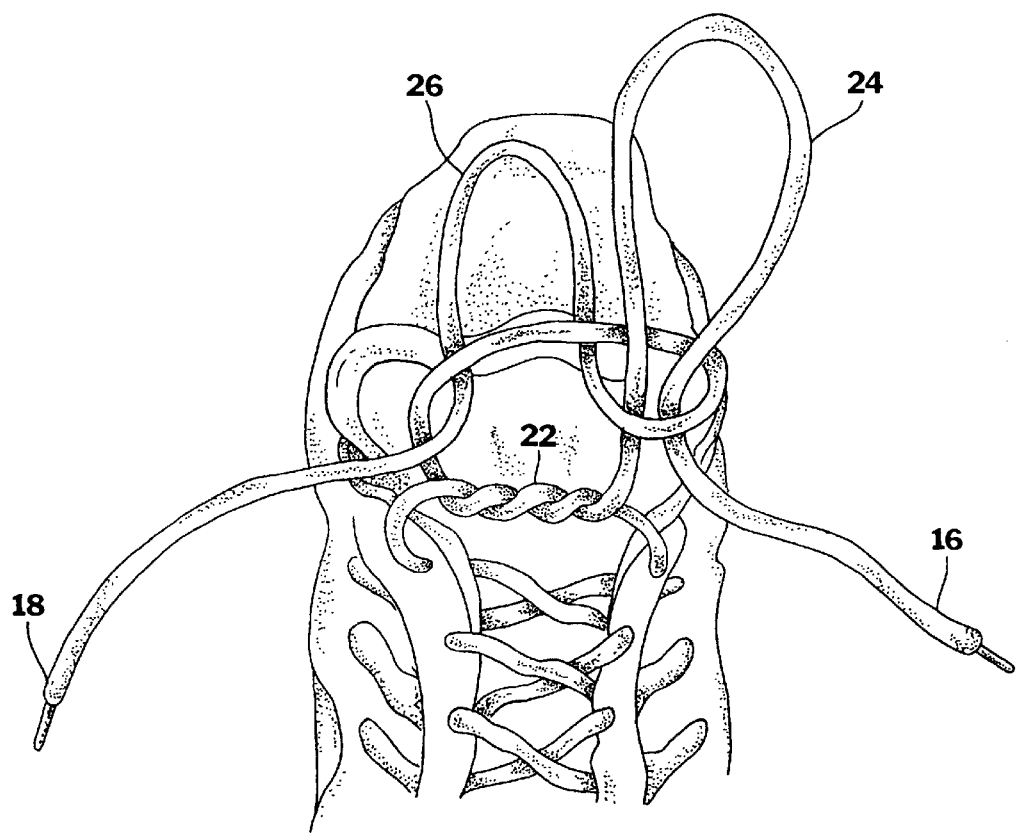
FIG. 5 is a diagrammatic perspective view, wherein one of the lace ends has been formed into a first loop, and the other lace end has been wrapped around the first loop and formed into a second loop.
Figure 6:
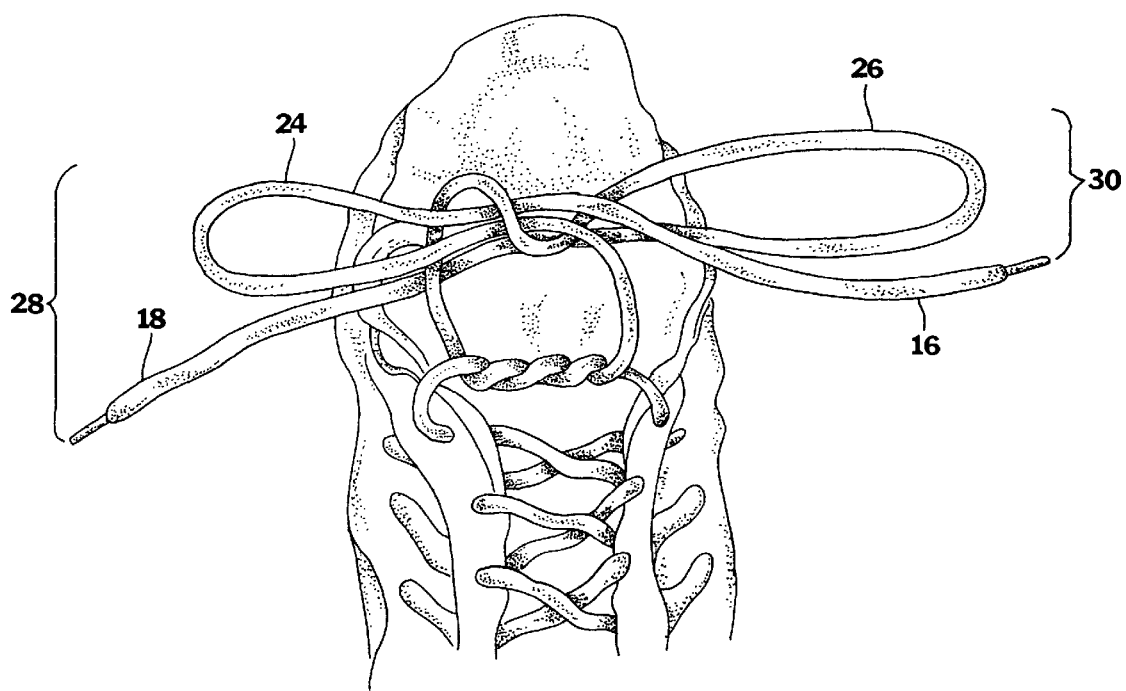
FIG. 6 is a diagrammatic perspective view, wherein the first loop, second loop, first lace end, and second lace end have been pulled laterally outward to form a bow knot, creating an underneath space between the bow knot and double simple knot.

Also in FIG. 4, the first lace end 16 has been formed into a first loop 24. Then, referring to FIG. 5, the second lace end 18 has been wrapped around the first loop 24, extending the second lace end 18 between itself and the double simple knot 22 just adjacent to the first loop 24. The second lace end 18 then forms a second loop 26, and then the second lace end 18 extends between itself and the double simple knot 22. Referring to FIG. 6, the first loop 24 and second lace end 18 have been grasped together in a first group 28, and the second loop 26 and first lace end 16 have been grasped together in a second group 30. The first group 28 and second group 30 have been opposite each other to form a bow knot 32. The bow knot 32 in FIG. 6 is intentionally not pulled tight. In general FIGS. 5 and 6 is a standard manner of tying the bow knot.

Figure 7:
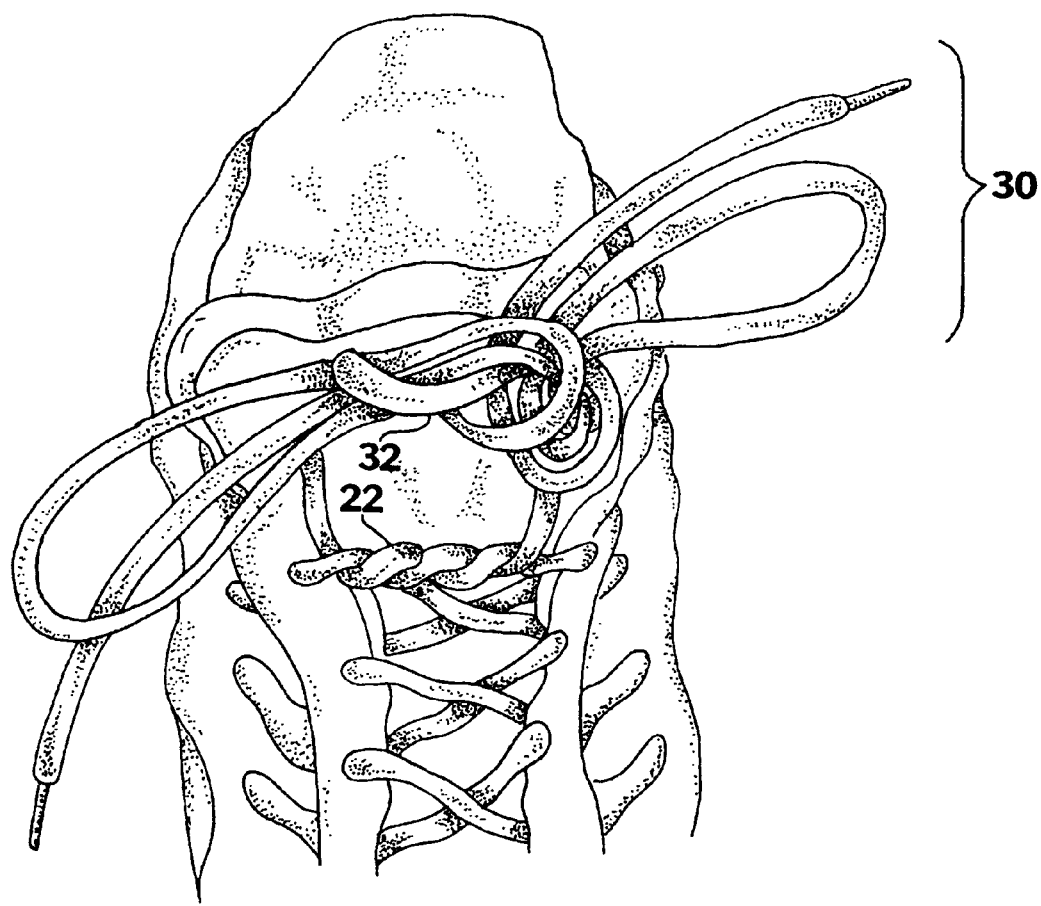
FIG. 7 is a diagrammatic perspective view, wherein second loop and first lace end have been wrapped around the bow know, and pulled between the bow knot and double simple knot.
Figure 8:
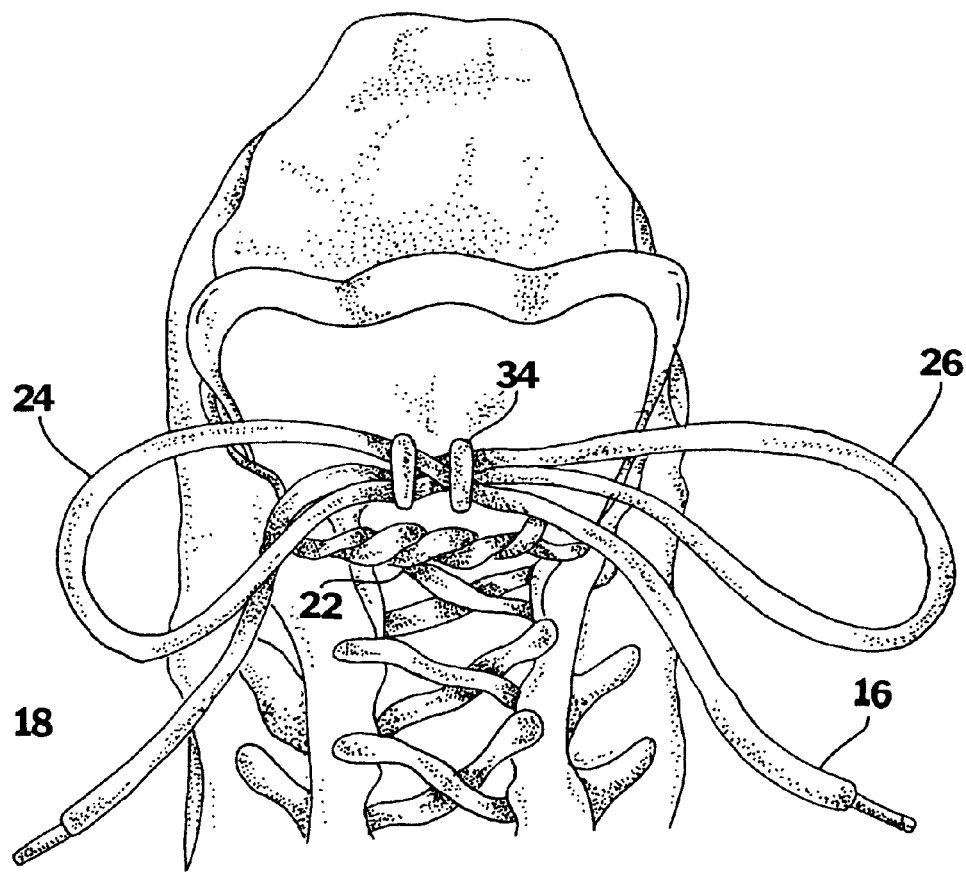
FIG. 8 is a diagrammatic perspective view, wherein the first loop and second loop have been pulled tight to complete the tying procedure.

FIG. 7 illustrates an unconventional step in the shoelace tying system according to the present invention, in which the first group 30 has been wrapped 360 degrees around the bow knot 32, by bringing the first group 30 between the bow knot and double simple knot 22. In FIG. 8, the first loop 26 and second loop 28 have been pulled tight, forming a double bow knot 34. Illustrated in FIG. 8, the space between the double bow knot 34 and double simple knot 22 has been exaggerated for clarity. Normally, there is no significant amount of space between the double simple knot 22 and double bow knot 34. Although the double bow knot 34 does not easily become untied on its own, it can be easily untied intentionally by pulling the first lace end 16 and second lace end 18.

In conclusion, herein is presented a system for effectively tying shoelaces, which is easy to perform, prevents the shoelaces from becoming inadvertently untied, but can be easily untied when desired.

What is claimed is:

1. A shoelace tying system, for tying a shoe lace in a shoe having a pair of top lace holes, a first lace end and a second lace end extending through the top place holes, comprising the steps of:

tying a simple knot with the first lace end and the second lace end;

tying a bow knot with the first lace end and second lace end, forming a first loop and a second loop and creating a space between the bow knot and simple knot; and forming a double bow knot by wrapping the first loop and second lace end around the bow knot and through the space between the bow knot and simple knot.

2. The shoelace tying system as recited in claim 1, further comprising the step of tightening the double bow against the simple knot by pulling the first loop and second loop opposite each other.

3. The shoe lace tying system as recited in claim 2, wherein the simple knot is a double simple knot.

4. The shoe lace tying system as recited in claim 3, wherein the step of tying the bow knot further comprises:

forming a first group with the first loop and second lace end;

forming a second group with the second loop and first lace end; and pulling the first group opposite from the second group.

* * * * *